(12) United States Patent
Reshetouski et al.

(10) Patent No.: US 11,378,866 B2
(45) Date of Patent: Jul. 5, 2022

(54) IMAGING APPARATUS AND IMAGING METHOD FOR CAPTURING BRIGHT IMAGE WITHOUT USING EXPENSIVE LARGE-DIAMETER LENS

(71) Applicant: SONY CORPORATION, Tokyo (JP)

(72) Inventors: Ilya Reshetouski, Tokyo (JP); Atsushi Ito, Kanagawa (JP); Hideki Oyaizu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/963,763

(22) PCT Filed: Jan. 18, 2019

(86) PCT No.: PCT/JP2019/001382
§ 371 (c)(1),
(2) Date: Jul. 21, 2020

(87) PCT Pub. No.: WO2019/150983
PCT Pub. Date: Aug. 8, 2019

(65) Prior Publication Data
US 2021/0041764 A1 Feb. 11, 2021

(30) Foreign Application Priority Data
Jan. 31, 2018 (JP) .............................. JP2018-015402

(51) Int. Cl.
*H04N 5/225* (2006.01)
*G03B 11/00* (2021.01)
*H04N 5/232* (2006.01)

(52) U.S. Cl.
CPC ........... *G03B 11/00* (2013.01); *H04N 5/2254* (2013.01); *H04N 5/23229* (2013.01)

(58) Field of Classification Search
CPC ..................................................... G03B 11/00
See application file for complete search history.

(56) References Cited

U.S. PATENT DOCUMENTS 5,073,789 A * 12/1991 Mumpower ........... G03B 11/00
396/337
2015/0185366 A1 7/2015 Bone et al.
(Continued)

FOREIGN PATENT DOCUMENTS

| CN | 1588168 A | 3/2005 |
| CN | 103380440 A | 10/2013 |

(Continued)

OTHER PUBLICATIONS

International Search Report and Written Opinion of PCT Application No. PCT/JP2019/001382, dated Mar. 26, 2019, 10 pages of ISRWO.

(Continued)

*Primary Examiner* — Gary C Vieaux
(74) *Attorney, Agent, or Firm* — Chip Law Group

(57) ABSTRACT

The present disclosure relates to an imaging apparatus and an imaging method that permit capture of a bright image without using an expensive large-diameter lens. A mirror surface having an opening portion larger in area than an imaging element is formed at a former stage of the imaging element. The mirror surface concentrates light from a subject surface. The imaging apparatus captures an image formed by light that directly enters the imaging element and light that is reflected by the mirror surface and reconstructs a final image from the captured image. The present disclosure is applicable to an imaging apparatus.

24 Claims, 16 Drawing Sheets

(56) References Cited

U.S. PATENT DOCUMENTS

| | | | |
|---|---|---|---|
| 2016/0065938 A1 | 3/2016 | Kazemzadeh et al. | |
| 2016/0309065 A1 | 10/2016 | Karafin et al. | |
| 2017/0041518 A1* | 2/2017 | Drazic ................ | H04N 5/2254 |
| 2017/0102671 A1 | 4/2017 | Damm et al. | |
| 2017/0139131 A1 | 5/2017 | Karafin et al. | |

FOREIGN PATENT DOCUMENTS

| | | | |
|---|---|---|---|
| CN | 104749733 A | | 7/2015 |
| CN | 105791651 A | | 7/2016 |
| CN | 108369399 A | | 8/2018 |
| EP | 3360012 A1 | | 8/2018 |
| JP | 2010-276433 A | | 12/2010 |
| JP | 2010276433 A | * | 12/2010 |
| JP | 2016-165070 A | | 9/2016 |
| JP | 2016165070 A | * | 9/2016 |
| KR | 10-2018-0080219 A | | 7/2018 |
| WO | 2016/168415 A1 | | 10/2016 |
| WO | 2017/062834 A1 | | 4/2017 |

OTHER PUBLICATIONS

Office Action for CN Patent Application No. 201980010107.5, dated Aug. 5, 2021, 8 pages of Office Action and 12 pages of English Translation.

Extended European Search Report of EP Application No. 19747402.6, dated Aug. 12, 2021, 08 pages.

Office Action for CN Patent Application No. 201980010107.5, dated Mar. 24, 2021, 10 pages of English Translation and 09 pages of Office Action.

Office Action for CN Patent Application No. 201980010107.5, dated Dec. 30, 2021, 10 pages of English Translation and 7 pages of Office Action.

\* cited by examiner

IMAGING APPARATUS AND IMAGING METHOD FOR CAPTURING BRIGHT IMAGE WITHOUT USING EXPENSIVE LARGE-DIAMETER LENS

CROSS REFERENCE TO RELATED APPLICATIONS

This application is a U.S. National Phase of International Patent Application No. PCT/JP2019/001382 filed on Jan. 18, 2019, which claims priority benefit of Japanese Patent Application No. JP 2018-015402 filed in the Japan Patent Office on Jan. 31, 2018. Each of the above-referenced applications is hereby incorporated herein by reference in its entirety.

TECHNICAL FIELD

The present disclosure relates to an imaging apparatus and an imaging method and particularly to an imaging apparatus and an imaging method that permit capture of a bright image without using an expensive large-diameter lens.

BACKGROUND ART

The optical efficiency (light utilization efficiency) of an imaging apparatus can be improved by increasing a lens size.

However, the larger the lens size, the greater the lens cost. In particular, the cost of an infrared lens increases significantly.

To cope with this problem, as a technology that provides improved light utilization efficiency without increasing the lens size, there is proposed a technology which generates an image having high light utilization efficiency by dividing incident light from a subject with a planar mirror, projecting the light in such a manner to be divided over a plurality of regions on an imaging element as a plurality of images, individually subjecting the respective images to a filtering process, and then reconstructing an image by using the plurality of images (see PTL 1).

CITATION LIST

Patent Literature

[PTL 1]
US Patent Application Publication No. 2016/0065938

SUMMARY

Technical Problem

However, the technology described in PTL 1 generates a reconstructed image from an image which is part of the resolution of the imaging element, resulting in degraded resolution.

The present disclosure has been made in view of such a circumstance, and it is particularly an object of the present disclosure to permit capture of a bright image without using an expensive large-diameter lens.

Solution to Problem

An imaging apparatus of an aspect of the present disclosure includes a guide section configured to guide incident light from a subject to an imaging element, an imaging section configured to capture an image of the incident light guided by the guide section as a pixel signal, and a signal processing section configured to reconstruct the pixel signal as a final image through signal processing.

An imaging method of an aspect of the present disclosure includes a guiding process of guiding incident light from a subject to an imaging element, an imaging process of capturing an image of the incident light guided by the guiding process as a pixel signal, and a signal processing process of reconstructing the pixel signal as a final image through signal processing.

In an aspect of the present disclosure, incident light is guided from a subject to an imaging element, an image of the guided incident light is captured as a pixel signal, and the pixel signal is reconstructed as a final image through signal processing.

Advantageous Effect of Invention

According to an aspect of the present disclosure, it is possible to capture a bright image particularly without using an expensive large-diameter lens.

DESCRIPTION OF EMBODIMENTS

A detailed description will be given below of preferred embodiments of the present disclosure with reference to attached drawings. It should be noted that the constituent elements having substantially the same functions in the present specification and the drawings are denoted by the same reference signs to omit redundant description.

Embodiments for carrying out the present technology will be described below. The description will be given in the following order:

1. Common imaging apparatus
2. First Embodiment
3. Modification example of the first embodiment
4. Second Embodiment
5. Modification example of the second embodiment

1. Common Imaging Apparatus

<Configuration of the Common Imaging Apparatus>

A description will be given first of a configuration of a common imaging apparatus before proceeding with the description of a configuration of the present disclosure.

Figure 1:
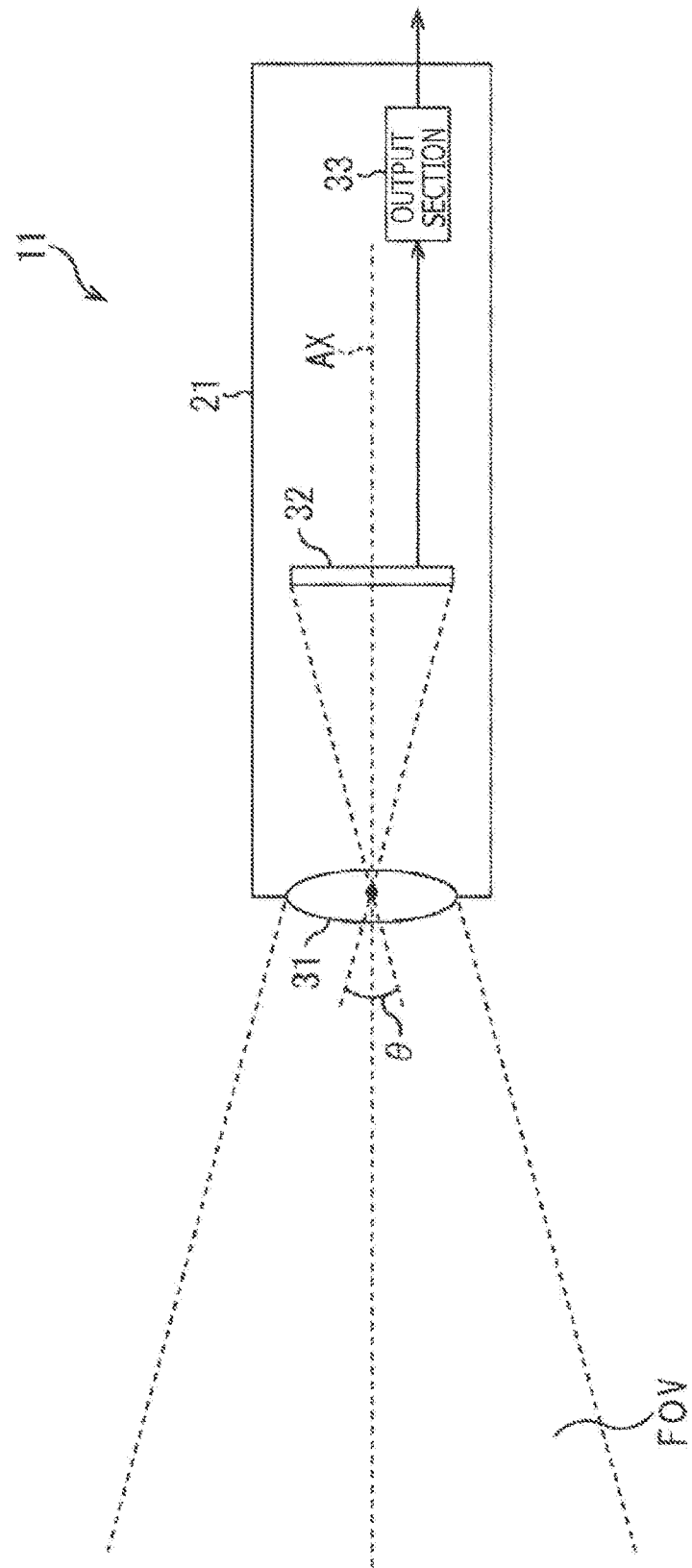
FIG. 1 is a diagram illustrating a configuration example of a common imaging apparatus.

FIG. 1 is a cross-sectional side view of a configuration of a common imaging apparatus. An imaging apparatus 11 illustrated in FIG. 1 includes a lens 31, an imaging element 32, and an output section 33, and these components are incorporated in a casing 21 in an integrated manner.

The lens 31 concentrates incident light within a field of view (FOV) and focuses it onto an imaging surface of the imaging element 32. In more detail, the lens 31 concentrates light within the field of view FOV at an angle of view e and projects the concentrated light onto the imaging element 32, forming an image on the imaging surface of the imaging element 32.

The imaging element 32 includes a CMOS (Complementary Metal Oxide Semiconductor) image sensor or a CCD (Charge Coupled Device) image sensor, captures an image obtained by concentrating light through the lens 31, and outputs the image to the output section 33 as a pixel-by-pixel signal.

The output section 33 performs signal processing on the basis of the pixel-by-pixel signal output from the imaging element 32 and outputs a resultant signal as an image signal.

It should be noted that center positions of the lens 31 and the imaging element 32 relative to a light transmission direction are aligned with an optical axis AX.

<Principle of Imaging of the Common Imaging Apparatus>

Figure 2:
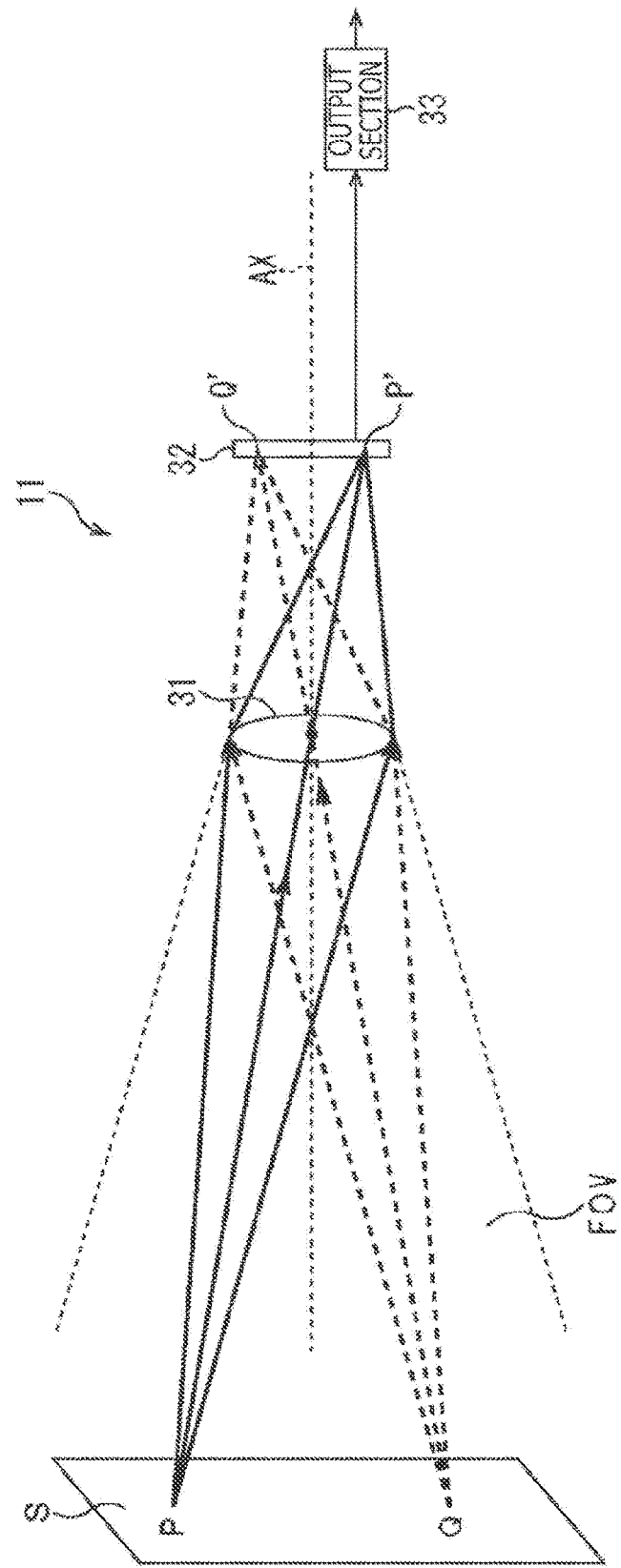
FIG. 2 is a diagram illustrating a principle of imaging by the imaging apparatus depicted in FIG. 1.

A description will be given next of a principle of imaging by the imaging apparatus 11 illustrated in FIG. 1 with reference to FIG. 2. It should be noted that FIG. 2 depicts, of the components of the imaging apparatus 11, only the lens 31, the imaging element 32, and the output section 33 that are required for description.

A surface that is spaced apart by a predetermined distance from a position at which the imaging apparatus 11 captures an image and on which a subject is present is defined as a subject surface S, and points P and Q on the subject surface S will be considered.

In a case where the point P on the subject surface S is a point light source, diffused light emitted from the point P, which is a point light source, passes through the lens 31 as illustrated by solid lines and is concentrated on the imaging surface of the imaging element 32, entering a point P' thereon.

Similarly, diffused light emitted from the point Q, which is a point light source, passes through the lens 31 as illustrated by dotted lines and is concentrated on the imaging surface of the imaging element 32, entering a point Q' thereon.

Also, diffused light emitted from other points is similarly concentrated by the lens 31 and enters the imaging surface of the imaging element 32.

More specifically, the lens 31 concentrates diffused light from respective point light sources on the subject surface S and causes light to be concentrated at corresponding points on the imaging surface of the imaging element 32, thus forming an image.

This causes an image on the subject surface S to be projected onto the imaging surface of the imaging element 32. As a result, an image of the subject surface is captured by the imaging element 32.

In other words, the points on the subject surface S and those on the imaging surface of the imaging element 32 correspond to each other on a one-to-one basis. This makes it necessary to cause more diffused light emitted from each point light source to enter the lens 31 and to be concentrated on the imaging surface in order to achieve higher light utilization efficiency, thus requiring increase in diameter of the lens 31.

However, the increase in diameter of the lens 31 leads to not only increased cost but also upsizing of the apparatus configuration as a result of the increase in diameter of the lens 31, thus resulting in reduced portability.

2. First Embodiment

Figure 3:
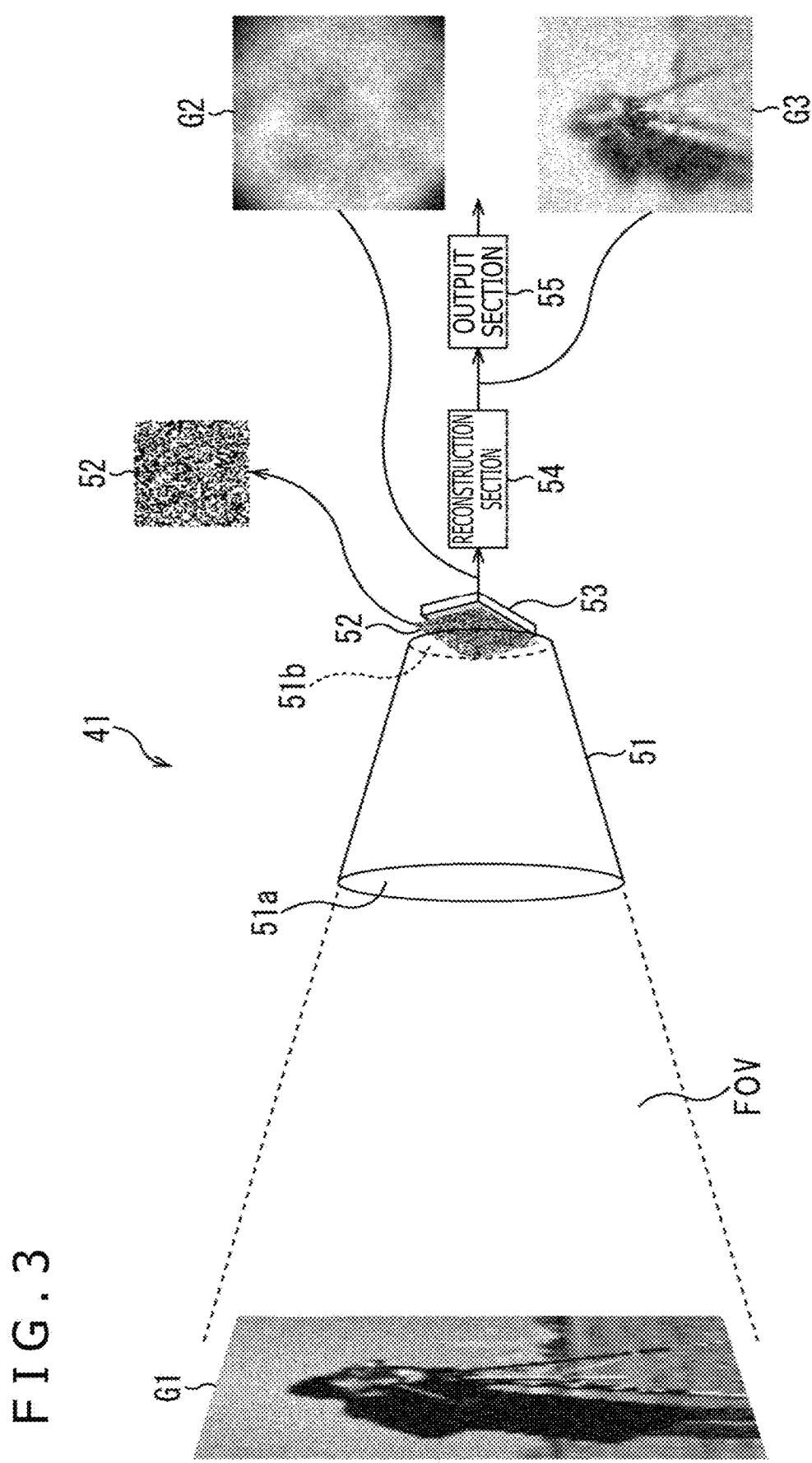
FIG. 3 is an external perspective view illustrating a configuration example of a first embodiment of an imaging apparatus of the present disclosure.

A description will be given next of a configuration example of a first embodiment of the imaging apparatus of the present disclosure with reference to FIGS. 3 and 4. FIG. 3 is an external perspective view of an imaging apparatus 41, and FIG. 4 is a cross-sectional side view thereof.

Figure 4:
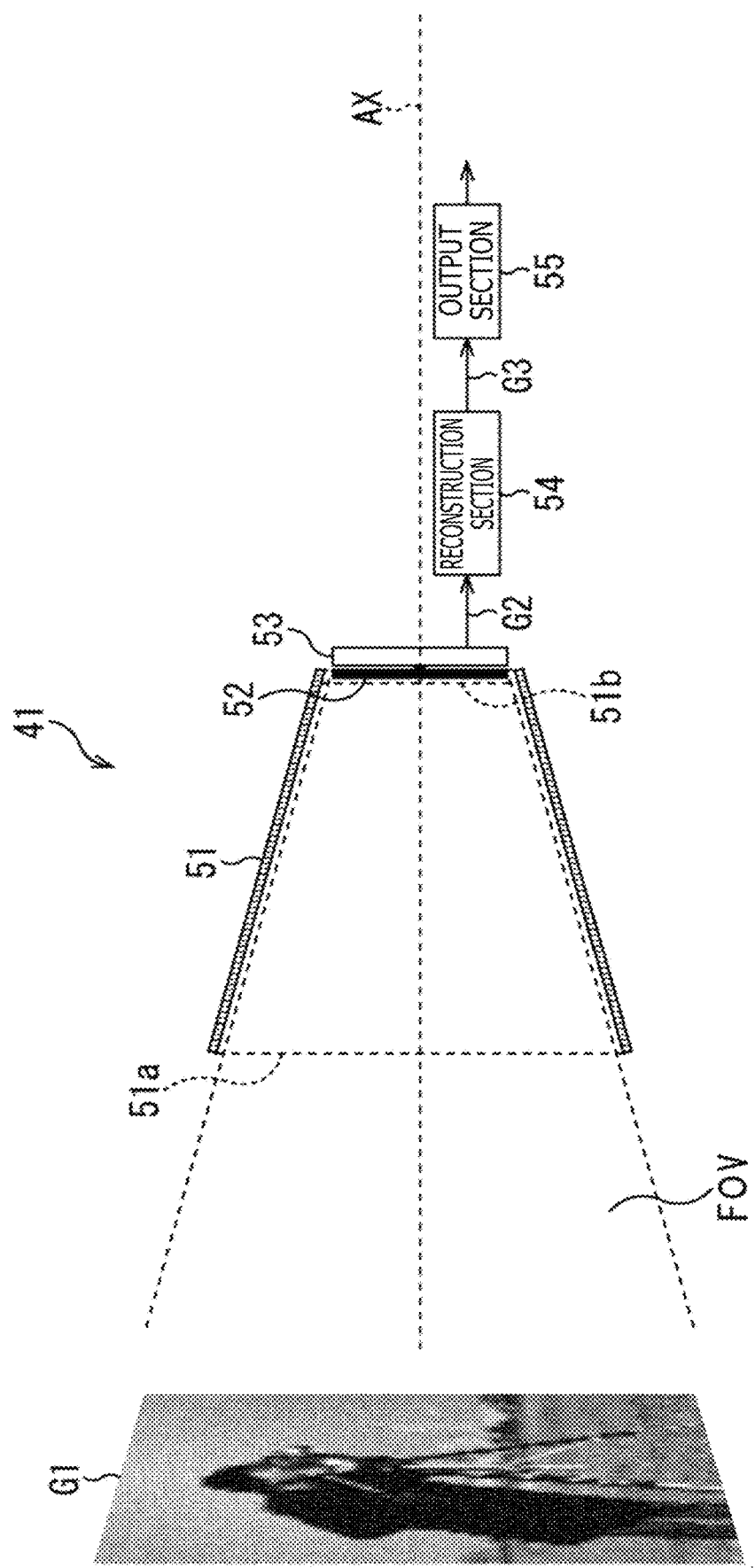
FIG. 4 is a cross-sectional side view illustrating the configuration example of the first embodiment of the imaging apparatus of the present disclosure.

The imaging apparatus 41 illustrated in FIGS. 3 and 4 includes a circular frustum-shaped mirror surface 51, a random mask 52, an imaging element 53, a reconstruction section 54, and an output section 55.

The circular frustum-shaped mirror surface 51 is formed in a shape of a circular frustum with a curved mirror surface inside. A large opening portion 51a and a small opening portion 51b smaller in diameter than the large opening portion 51a are provided, with center positions of the large opening portion 51a and the small opening portion 51b aligned with the optical axis AX.

Also, incident light from a subject surface G1 enters the large opening portion 51a, entering the imaging element 53 through the random mask 52 provided at the small opening portion 51b. Although approximately identical in size to the random mask 52 and the imaging element 53, the small opening portion 51b is a size large enough to accommodate the whole of the random mask 52 and the imaging element 53 therein.

Figure 5:
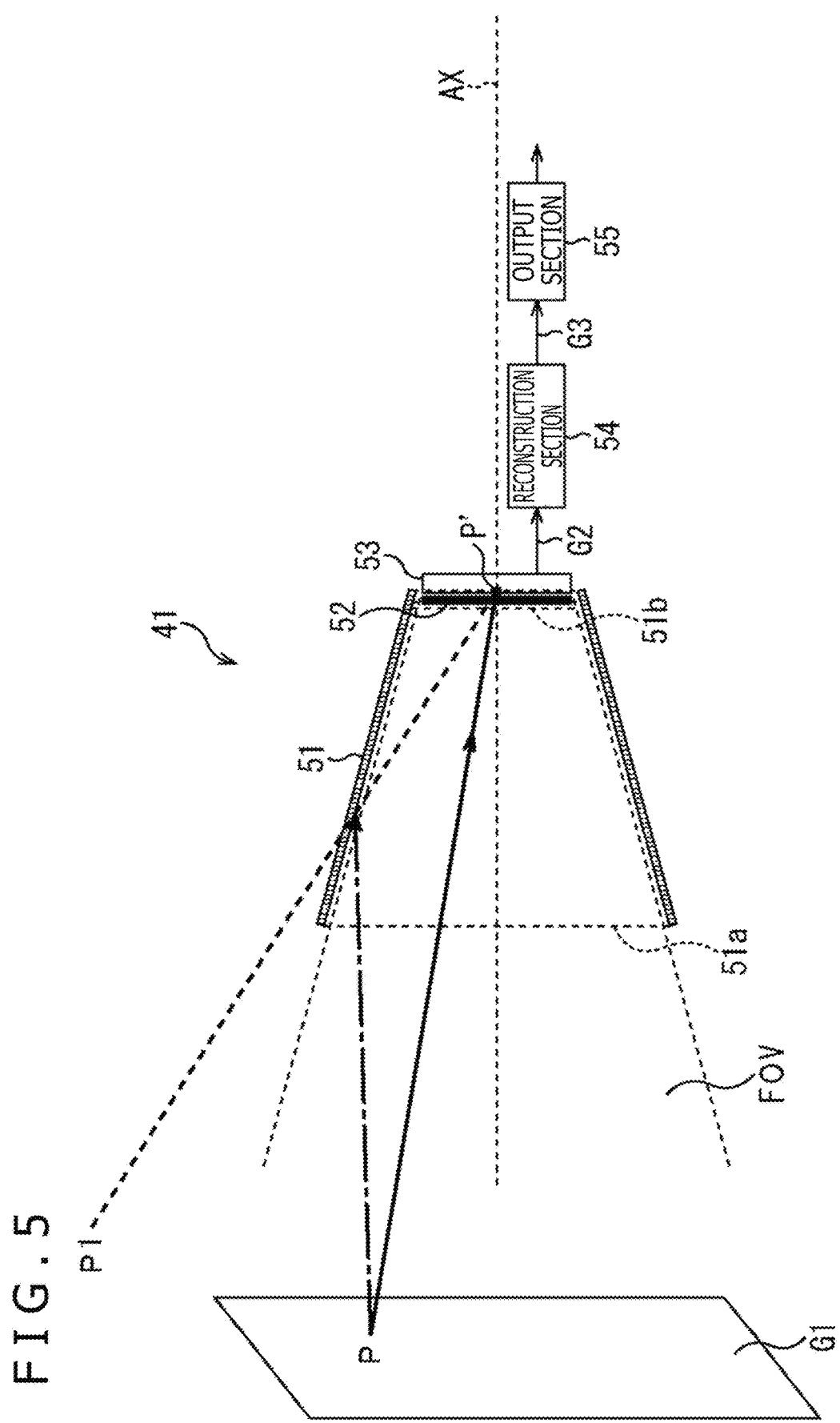
FIG. 5 is a diagram illustrating a principle of imaging by the imaging apparatus depicted in FIGS. 3 and 4.

In more detail, there are two optical paths of incident light from the point P on the subject surface G1; one in which incident light directly enters the point P' on the imaging element 53 through the random mask 52 after passing through the large opening portion 51a as illustrated by a solid line in FIG. 5; and the other in which incident light, after passing through the large opening portion 51a, is reflected by the mirror surface 51 first and then enters the point P' on the imaging element 53 through the random mask 52 as illustrated by a one-dot chain line and a dotted line in FIG. 5.

More specifically, in the imaging apparatus 41 illustrated in FIGS. 3 and 4, of diffused light from the point P, light which would otherwise not enter the imaging element 53 unless the circular frustum-shaped mirror surface 51 is provided is reflected by the circular frustum-shaped mirror surface 51, thus allowing the light to enter the point P' on the imaging element 53 as diffused light from a virtual point P1.

As a result, the provision of the circular frustum-shaped mirror surface 51 makes it possible to enhance the light utilization efficiency.

Specifically, as compared to a case where the circular frustum-shaped mirror surface 51 is not provided, light concentration capability with the circular frustum-shaped mirror surface 51 provided is approximately (an area of the large opening portion 51a)/(an area of the small opening portion 51b) times the light concentration capability without the circular frustum-shaped mirror surface 51. That is, in a case where the large opening portion 51a is, for example, five times larger in area than the small opening portion 51b, an amount of light that enters the imaging element 53 through the random mask 52 is approximately five times an amount of light when the circular frustum-shaped mirror surface 51 is not provided. That is, in this case, the imaging apparatus 41 can capture five times brighter image.

The random mask 52 modulates incident light from the subject surface G1 through the circular frustum-shaped mirror surface 51, causing the light to enter the imaging surface of the imaging element 53.

In this case, as illustrated at the top right in FIG. 3, the random mask 52 has a mask pattern formed such that opening portions and light-shielding portions are set to be random in a horizontal direction and a vertical direction per unit size Δ.

The unit size Δ is at least larger than a pixel size of the imaging element 53. Also, there is provided a gap having an extremely small distance 'd' between the imaging element 53 and the random mask 52.

Figure 6:
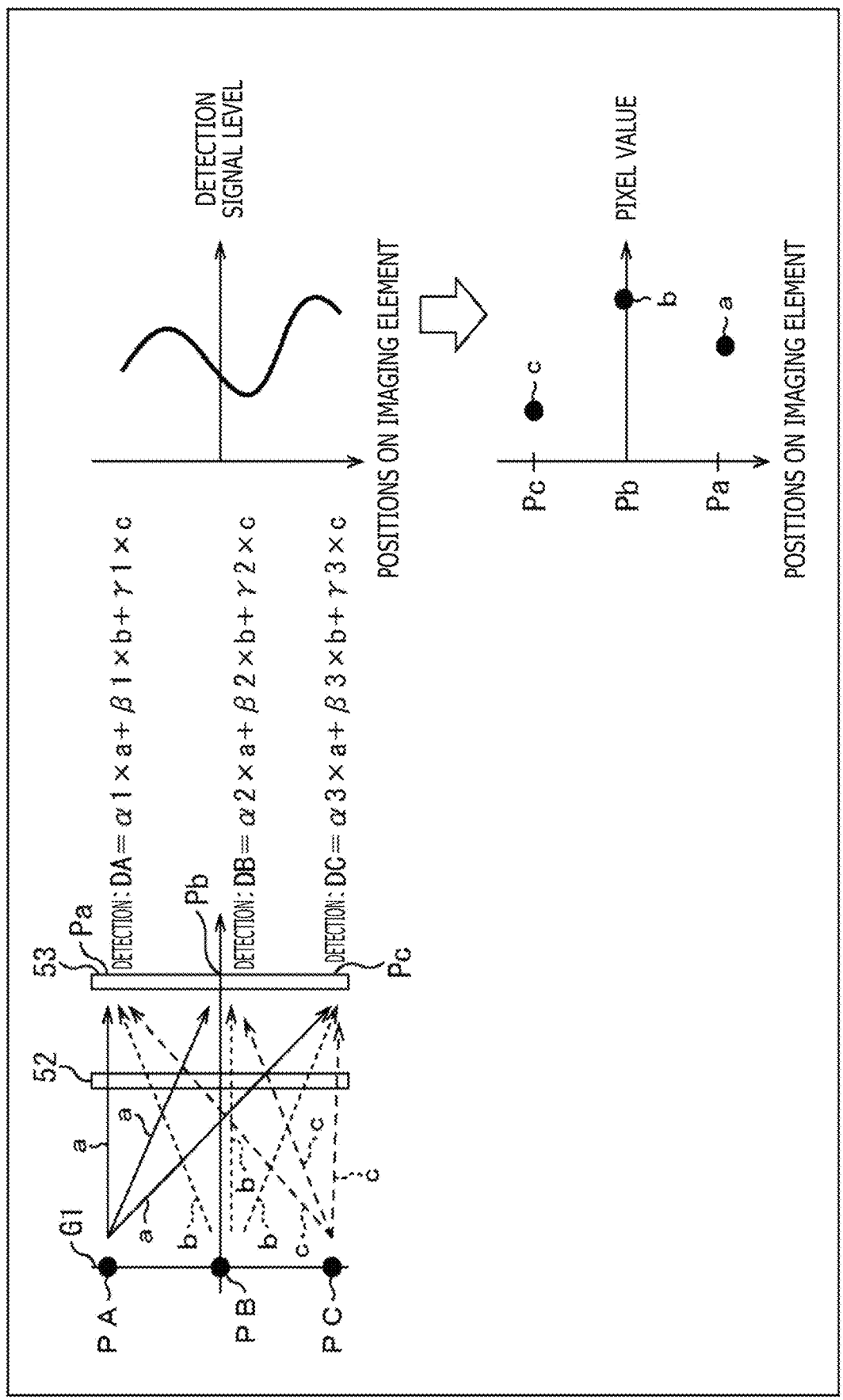
FIG. 6 is a diagram illustrating a principle of reconstruction.

As illustrated at the top left in FIG. 6, for example, we assume that light beams with light intensities 'a,' 'b,' and 'c' from point light sources PA, PB, and PC on the subject surface G1 pass through the random mask 52 and enter respective positions Pa, Pb, and Pc on the imaging element 53.

As illustrated at the top left in FIG. 6, a detection sensitivity of each pixel is assigned a directivity in response to an incident angle as a result of modulation of incident light by the randomly set opening portions. The term "assigning an incident angle directivity to a detection sensitivity of each pixel" refers to ensuring that a photoreception sensitivity in response to an incident angle of incident light varies from one region of the imaging element 53 to another.

That is, in a case where it is on the assumption that light sources included in the subject surface G1 are point light sources, light beams with the same light intensity from the same light source enter the imaging element 53. However, as the light beams are modulated by the random mask 52, the incident angle varies from one region to another on the imaging surface of the imaging element 53. Then, since the light beams each have a photoreception sensitivity characteristic, i.e., an incident angle directivity, resulting from variation of the incident angle of incident light from one region to another of the imaging element 53 by the random mask 52, even if the light beams have the same light intensity, the light beams are detected with different sensitivities from one region of the imaging element 53 to another due to the random mask 52 provided at the former stage of the imaging surface of the imaging element 53, so that detection signals having different detection signal levels from one region to another are detected.

More specifically, pixel detection signal levels DA, DB, and DC at the positions Pa, Pb, and Pc on the imaging element 53 are expressed, respectively, by the following formulas (1) to (3), as illustrated at the top right in FIG. 6:

$$DA = \alpha 1 \times a + \beta 1 \times b + \gamma 1 \times c$$

$$DB = \alpha 2 \times a + \beta 2 \times b + \gamma 2 \times c$$

$$DC = \alpha 3 \times a + \beta 3 \times b + \gamma 3 \times c$$

Here, α1 is a coefficient for a detection signal level 'a' set in response to the incident angle of the light beam from the point light source PA on the subject surface G1 restored at the position Pa on the imaging element 53. It should be noted that the light beam from the point light source PA includes both the light beam that directly enters the imaging element 53 and the light beam that is reflected by the circular frustum-shaped mirror surface 51.

Also, β1 is a coefficient for a detection signal level 'b' set in response to the incident angle of the light beam from the point light source PB on the subject surface G1 restored at the position Pa on the imaging element 53. It should be noted that the light beam from the point light source PB includes both the light beam that directly enters the imaging element 53 and the light beam that is reflected by the circular frustum-shaped mirror surface 51.

Further, γ1 is a coefficient for a detection signal level 'c' set in response to the incident angle of the light beam from the point light source PC on the subject surface G1 restored at the position Pa on the imaging element 53. It should be noted that the light beam from the point light source PC includes both the light beam that directly enters the imaging element 53 and the light beam that is reflected by the circular frustum-shaped mirror surface 51.

Therefore, (α1×a) in the detection signal level DA represents the detection signal level attributable to the light beam from the point light source PA at the position Pc.

Also, (β1×b) in the detection signal level DA represents the detection signal level attributable to the light beam from the point light source PB at the position Pc.

Further, (γ1×c) in the detection signal level DA represents the detection signal level attributable to the light beam from the point light source PC at the position Pc.

Therefore, the detection signal level DA is expressed as a composite value of products of respective components of the point light sources PA, PB, and PC at the position Pa by the respective coefficients α1, β1, and γ1. Hereinafter, the coefficients α1, β1, and γ1 will be together referred to as a coefficient set.

Similarly, a coefficient set of α2, β2, and γ2 for the detection signal level DB at the point light source PB corresponds, respectively, to the coefficient set of α1, β1, and γ1 for the detection signal level DA at the point light source PA. Also, a coefficient set of α3, β3, and γ3 for the detection signal level DC at the point light source PC corresponds, respectively, to the coefficient set of α1, β1, and γ1 for the detection signal level DA at the point light source PA.

It should be noted, however, that the detection signal levels of the pixels at the positions Pa, Pb, and Pc are values expressed by sums of products of intensities 'a,' 'b,' and 'c' of the light beams emitted, respectively, from the point light sources PA, PB, and PC by their coefficients. For this reason, these detection signal levels are mixtures of the intensities 'a,' 'b,' and 'c' of the light beams emitted, respectively, from the point light sources PA, PB, and PC and as a result, are different from a formed image of the subject. It should be noted that the image including the detection signal levels DA, DB, and DC of the pixels at these positions Pa, Pb, and Pc corresponds to an image G2 illustrated in FIG. 3.

That is, the pixel values at the positions Pa, Pb, and Pc are obtained, as illustrated at the bottom right in FIG. 6 by establishing simultaneous equations using these coefficient sets of α1, β1, and γ1, α2, β2, and γ2, and α3, β3, and γ3, and the detection signal levels DA, DB, and DC and solving the equations for the light intensities 'a,' 'b,' and 'c.' As a result, a restored image (final image), a set of pixel values, is reconstructed and restored.

Also, in the case where the distance between the imaging element 53 and the subject surface G1 illustrated at the top left in FIG. 6 changes, each of the coefficient sets of α1, β1, and γ1, α2, β2, and γ2, and α3, β3, and γ3 changes, and it is possible to reconstruct restored images (final images) of the subject surface at various distances by changing these coefficient sets.

For this reason, images of the subject surface at various distances from the imaging position can be reconstructed by changing the coefficient sets so as to be suitable for various distances through a single occasion of imaging.

As a result, during imaging using the imaging apparatus 41 illustrated in FIGS. 3 and 4, there is no need to be conscious of a so-called out-of-focus phenomenon that causes out-of-focus imaging during imaging with the imaging apparatus 11 having a lens. As long as a desired subject is captured in such a manner as to be included in the field of view FOV, images of the subject surface at various distances can be reconstructed after imaging by changing the coefficient sets according to the distance.

It should be noted that the detection signal levels illustrated at the top right in FIG. 6 are not detection signal levels corresponding to the image obtained as a result of formation of the subject's image and therefore, are not pixel values. Also, the detection signal levels illustrated at the bottom right in FIG. 6 are pixel-by-pixel signal levels corresponding to the image obtained as a result of formation of the subject's image, i.e., respective pixel values of the restored image (final image) and therefore, are pixel values. That is, the restored image (final image) of this subject surface G1 corresponds to the image G3.

Such a configuration makes it possible for the imaging apparatus 41 to function as a so-called lensless imaging apparatus. As a result, an imaging lens is not essential, thus allowing for reduction in height of the imaging apparatus, i.e., reducing the thicknesses of the components for realizing the imaging function relative to the light incidence direction. Also, it becomes possible to reconstruct and restore final images (restored images) of the subject surface at various distances by changing the coefficient sets in various ways.

It should be noted that, in the description below, an image captured by the imaging element 53 that has yet to be reconstructed will be simply referred to as a captured image and that an image reconstructed and restored as a result of signal processing of the captured image will be referred to as a final image (restored image). Therefore, it is possible to reconstruct, from a single captured image, images of the subject surface G1 at various distances as final images by changing the coefficient sets described above in various ways.

The reconstruction section 54 includes the coefficients sets described above and reconstructs a final image (restored image) on the basis of the image captured by the imaging element 53 by using the coefficient sets corresponding to the distance from the imaging position of the imaging apparatus 41 to the subject surface G1, outputting the final image to the output section 55.

The output section 55 performs signal processing on the final image supplied from the reconstruction section 54 and outputs the resultant image as an image signal.

<Imaging Process by the Imaging Apparatus Illustrated in FIGS. 3 and 4>

Figure 7:
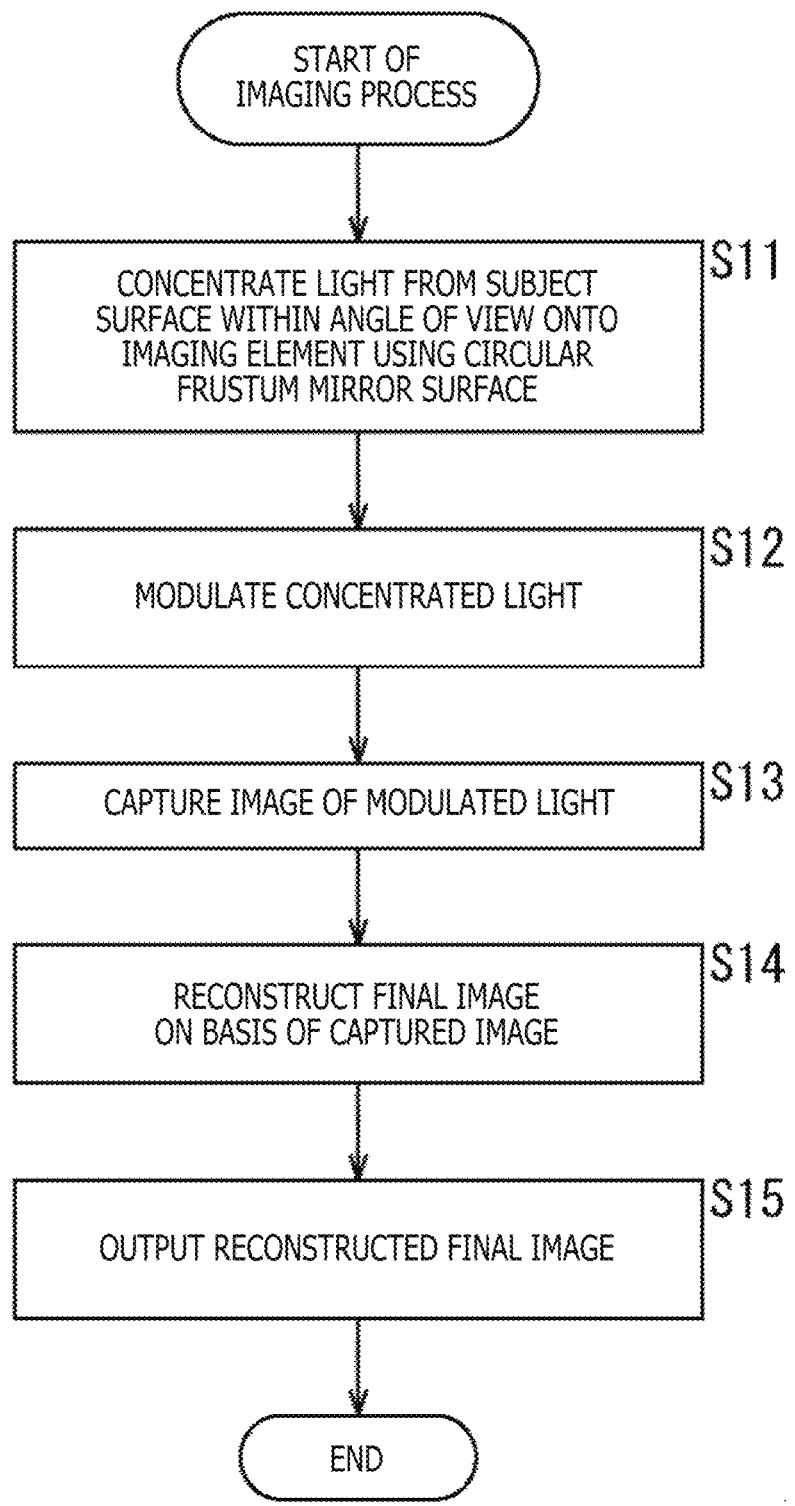
FIG. 7 is a flowchart illustrating an imaging process by the imaging apparatus depicted in FIGS. 3 and 4.

A description will be given next of an imaging process performed by the imaging apparatus 41 illustrated in FIGS. 3 and 4 with reference to the flowchart illustrated in FIG. 7.

In step S11, the circular frustum-shaped mirror surface 51 concentrates light from the subject surface G1, causing concentrated light to pass through the random mask 52.

In step S12, the random mask 52 modulates light from the subject surface G1 concentrated by the circular frustum-shaped mirror surface 51, causing the light to enter the imaging element 53.

In step S13, the imaging element 53 captures a silhouette that includes light from the subject surface G1, concentrated by the circular frustum-shaped mirror surface 51, and further modulated by the random mask 52, outputting the image to the reconstruction section 54 as a captured image. That is, in this case, the image of the subject surface G1 illustrated in FIG. 3 is captured by the imaging element 53 as a captured image as illustrated in the image G2 as a result of the concentration of light by the circular frustum-shaped mirror surface 51 and the modulation by the random mask 52. That is, as diffused light from the point light sources at the respective points on the subject surface G1 is concentrated by the circular frustum-shaped mirror surface 51, followed by the reception in a manner diffused over various pixels of the imaging element 53, and further superimposition of different beams of light for each pixel unit, the pixel values of each pixel of the image G2 are smoothed, causing the image G2 to be captured as a blurred image as a whole.

In step S14, the reconstruction section 54 reconstructs an image by using predetermined coefficient sets in response to the distance from the imaging position of the imaging apparatus 41 to the subject surface G1 on the basis of the image G2 which is a captured image obtained by capturing an image that includes modulated light output from the imaging element 53 and outputs the reconstructed image as a final image (restored image) to the output section 55. That is, a final image (restored image) as illustrated in the image G3 is obtained, for example, by establishing and solving simultaneous equations for the image G2 using the coefficient sets described with reference to the above formulas (1) to (3).

In step S15, the output section 55 performs signal processing and outputs the final image as an image signal.

That is, the above series of processes provides improved light utilization efficiency by use of the circular frustum-shaped mirror surface 51 without using any expensive lens. Also, a final image (restored image) is reconstructed by using coefficient sets after modulation with a random mask without using any lens, thus allowing for reduction in height.

Since the random mask 52 is used to modulate incident light, other component may be used as long as it includes a patterned mask capable of modulating incident light, and a diffraction grating or a diffuser may be used, for example.

3. Modification Example of the First Embodiment

An example has been described above in which the imaging apparatus includes the circular frustum-shaped mirror surface 51 having a curved mirror surface. However, the circular frustum-shaped mirror surface 51 may have planar mirror surfaces in place of a curved one.

Figure 8:
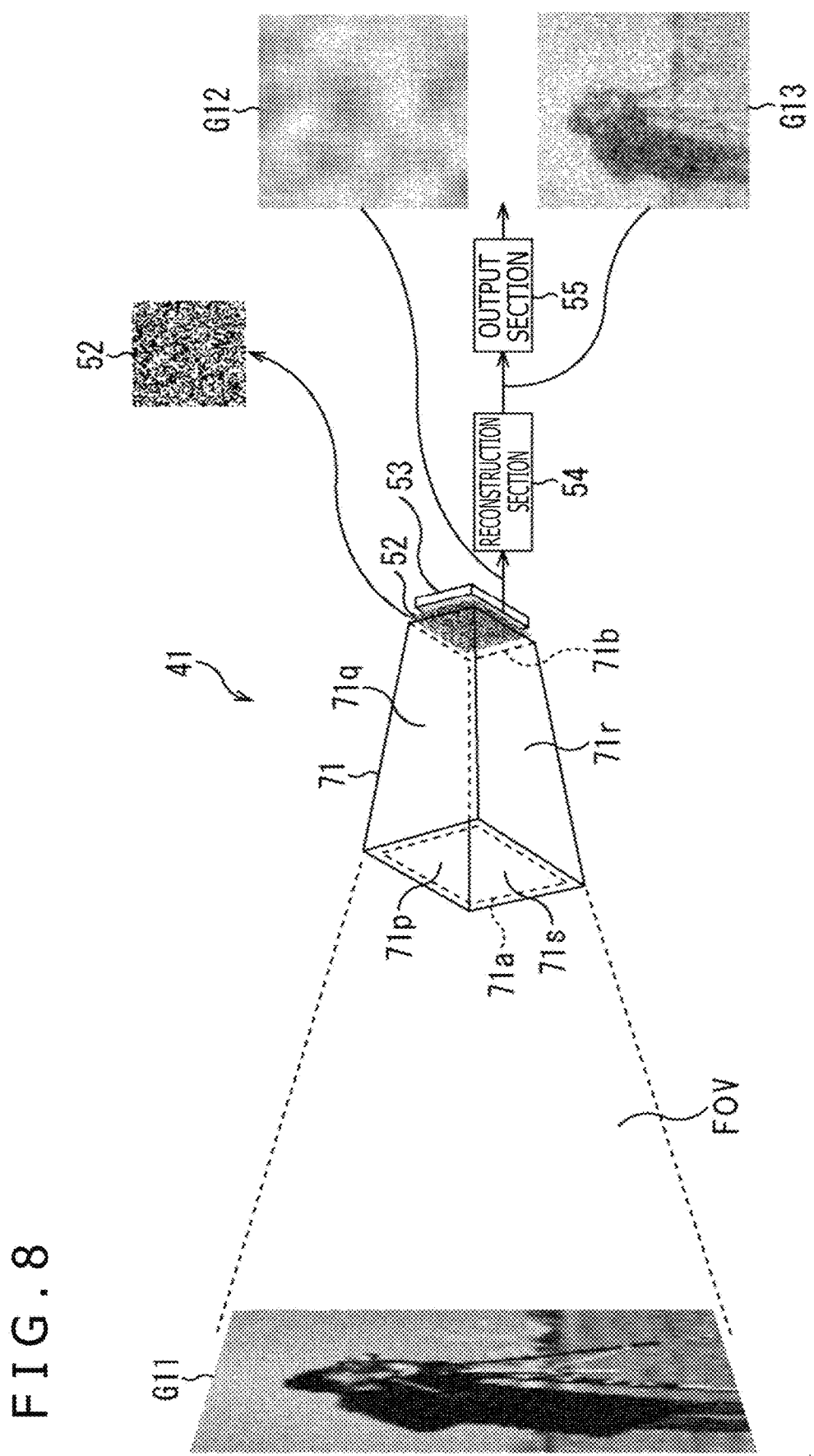
FIG. 8 is a diagram illustrating a modification example of the first embodiment of the present disclosure.

FIG. 8 illustrates a modification example of the imaging apparatus 11 of the first embodiment in which a rectangular frustum-shaped mirror surface 71 including four planar mirror surfaces is provided in place of the circular frustum-shaped mirror surface 51 that includes a curved mirror surface.

The rectangular frustum-shaped mirror surface 71 illustrated in FIG. 8 has four (4) planar mirrors 71p to 71s, and a large opening portion 71a which incident light enters from a subject surface G11 is formed larger than a small opening portion 71b provided with the random mask 52 and the imaging element 53.

The imaging apparatus 41 illustrated in FIG. 8 can also provide increased light utilization efficiency corresponding to a scaling factor determined by a ratio in area of the large opening portion 51a to the small opening portion 51b.

It should be noted that, in a case where the rectangular frustum-shaped mirror surface 71 is used, the use of planar mirror surfaces makes it easier to make a definition using the above matrix, thus ensuring reduced computational load on the reconstruction section 54.

4. Second Embodiment

Configuration examples of imaging apparatuses including a mirror surface or mirror surfaces and with no lens have been described above. However, an image associating points on the subject surface with predetermined positions on the imaging element may be captured by using a lens as a captured image to reconstruct a final image on the basis of the captured image.

Figure 9:
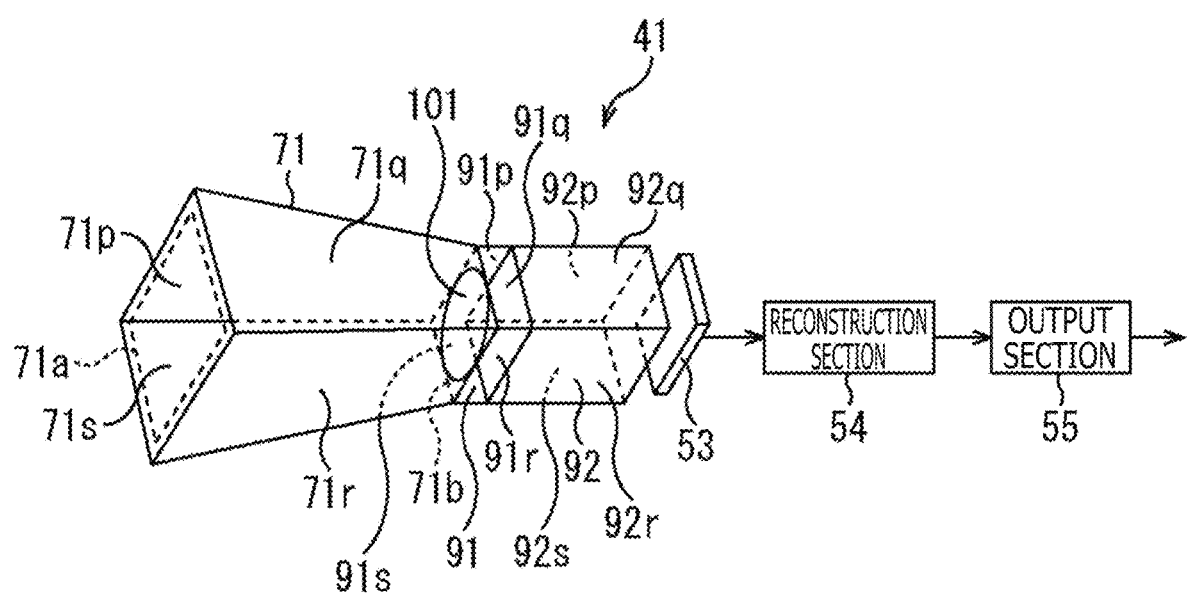
FIG. 9 is an external perspective view illustrating a configuration example of a second embodiment of the imaging apparatus of the present disclosure.
Figure 10:
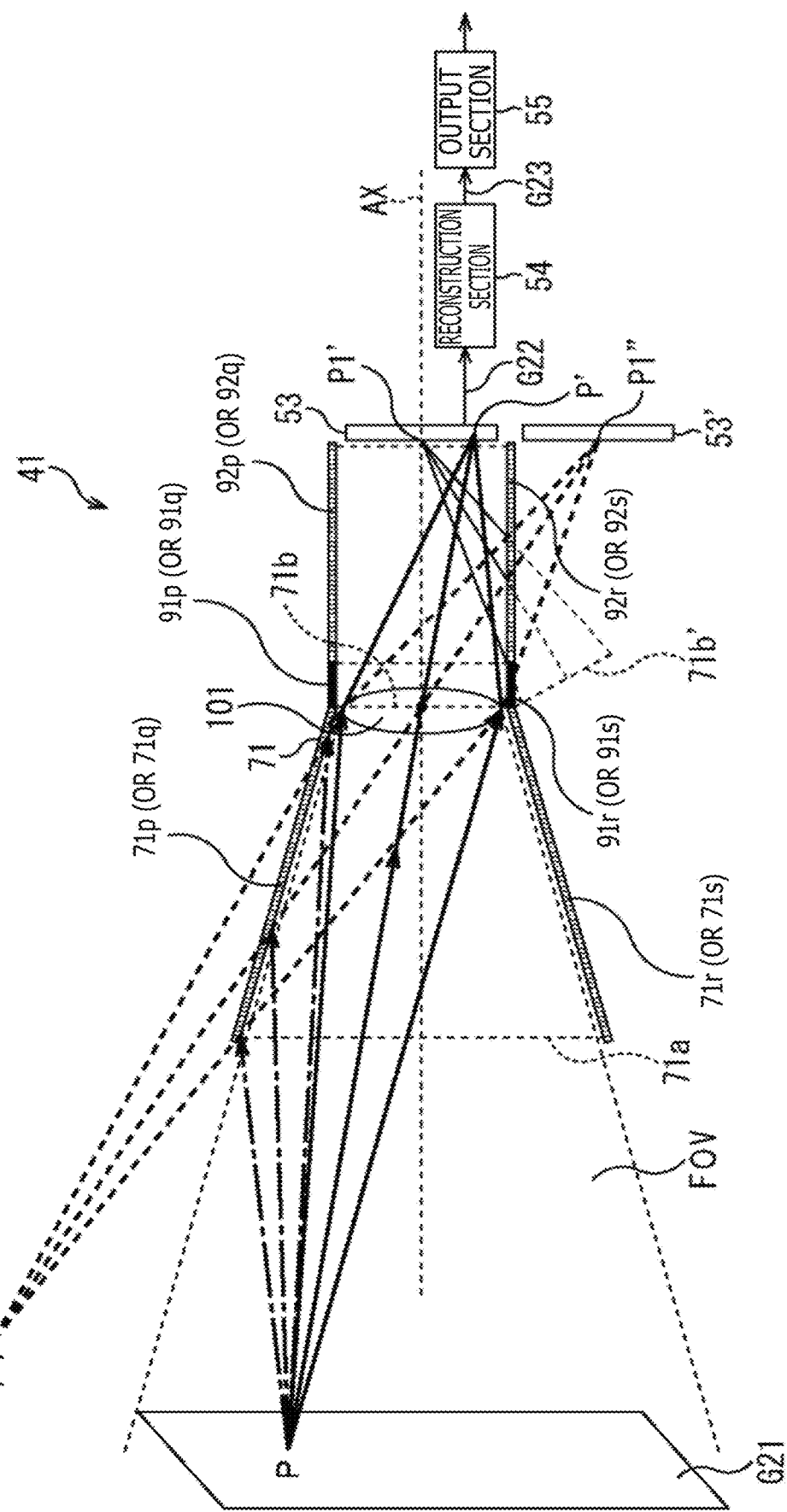
FIG. 10 is a cross-sectional side view illustrating the configuration example of the second embodiment of the imaging apparatus of the present disclosure.

FIGS. 9 and 10 illustrate a configuration example of the imaging apparatus 41 provided with a lens 101 in place of the random mask 52. It should be noted that FIG. 9 is an external perspective view of the imaging apparatus 41, and FIG. 10 is a cross-sectional side view of the planar mirror surface 71q of the rectangular frustum-shaped mirror surface 71 of the imaging apparatus 41 illustrated in FIG. 9 as seen from the front.

The imaging apparatus 41 illustrated in FIGS. 9 and 10 includes the rectangular frustum-shaped mirror surface 71, the lens 101, a prismatic light absorption section 91, a prismatic mirror surface 92, the imaging element 53, the reconstruction section 54, and the output section 55. It should be noted that the components of the imaging apparatus 41 illustrated in FIGS. 9 and 10 having the same functions as those of the imaging apparatus 41 illustrated in FIG. 8 are denoted by the same reference signs and that the description thereof will be omitted as appropriate.

That is, the imaging apparatus 41 illustrated in FIGS. 9 and 10 differs from the imaging apparatus 41 illustrated in FIG. 8 in that the lens 101, the prismatic light absorption section 91, and the prismatic mirror surface 92 are provided in place of the random mask 52.

The lens 101 has the same configuration as the lens 31 illustrated in FIG. 1 and further concentrates light which enters from a subject surface G21 and is concentrated by the rectangular frustum-shaped mirror surface 71 to project the light onto the imaging surface of the imaging element 53.

The prismatic light absorption section 91 is a portion provided at the latter stage of the lens 101 and including a prismatic light absorption member that includes four planar light absorption members 91p to 91s each having the same size as a diameter of the lens 101, and since the prismatic light absorption section 91 absorbs incident light with the planar light absorption members 91p to 91s on the prismatic inside, entry of the incident light into the imaging element 53 from a range outside the field of view FOV is prevented. The principle of preventing the entry of incident light into the imaging element 53 from the range outside the field of view FOV will be described later in detail with reference to FIG. 12.

The prismatic mirror surface 92 is provided at the latter stage of the prismatic light absorption section 91 and reflects light that has passed through the lens 101 with four planar mirrors 92p to 92s provided on the prismatic (cylindrical shape with a rectangular cross-sectional opening) inside, thereby causing the light to enter the imaging surface of the imaging element 53.

In more detail, as illustrated in FIG. 10, of diffused light from the point P on the subject surface G21 as a point light source, light indicated by solid lines is concentrated by the lens 101 and concentrated onto the point P' on the imaging element 53 to be projected.

Also, of diffused light from the point P on the subject surface G21 as a point light source, light indicated by a one-dot chain line is reflected by the planar mirror 71p of the rectangular frustum-shaped mirror surface 71 and passes through the lens 101 as diffused light from the virtual point P1 indicated by dotted lines. Further, after passing through the lens 101, diffused light from the virtual point P1 is virtually concentrated on a point P1" on a virtual imaging element 53' different from the imaging element 53 to be projected. In reality, however, after passing through the lens 101, diffused light from the virtual point P1 is reflected by the prismatic mirror surface 92 and concentrated onto a point P1' on the imaging element 53 to be projected.

As a result, while diffused light from the point P on the subject surface G21 is distributed over a plurality of points on the imaging element 53, the diffused light is concentrated by the lens 101 to be projected and captured.

That is, the concentration of light by the rectangular frustum-shaped mirror surface 71 is achieved by guiding diffused light from the point P on the subject surface G21 onto the prismatic mirror surface 92 (onto the lens 101) in a diffused condition. In contrast, the concentration of light by the lens 101 is achieved by concentrating diffused light from the point P on the subject surface G21 to a predetermined single focal point according to a focal distance.

In the imaging apparatus 41 illustrated in FIGS. 9 and 10, diffused light from the respective points on the subject surface G21 as point light sources is guided to the lens 101 in a diffused condition by the planar mirror 71p of the rectangular frustum-shaped mirror surface 71, and further reflected inside the prismatic mirror surface 92 while being concentrated to one of the focal points on the imaging element 53 by the lens 101 to be projected onto the imaging element 53.

Also, at this time, as illustrated in FIG. 10, diffused light from the respective points on the subject surface G21 as point light sources differs in pixel position between a case where diffused light directly enters the lens 101 and is concentrated and the concentrated light is further concentrated onto the imaging element 53 to be projected and a case where diffused light is reflected by the rectangular frustum-shaped mirror surface 71 first and then enters the lens 101 and further is reflected by the prismatic mirror surface 92 and projected onto the imaging element 53. In other words, a plurality of points of light on the subject surface G21 is projected onto each pixel of the imaging element 53 in a superimposed manner.

Figure 11:
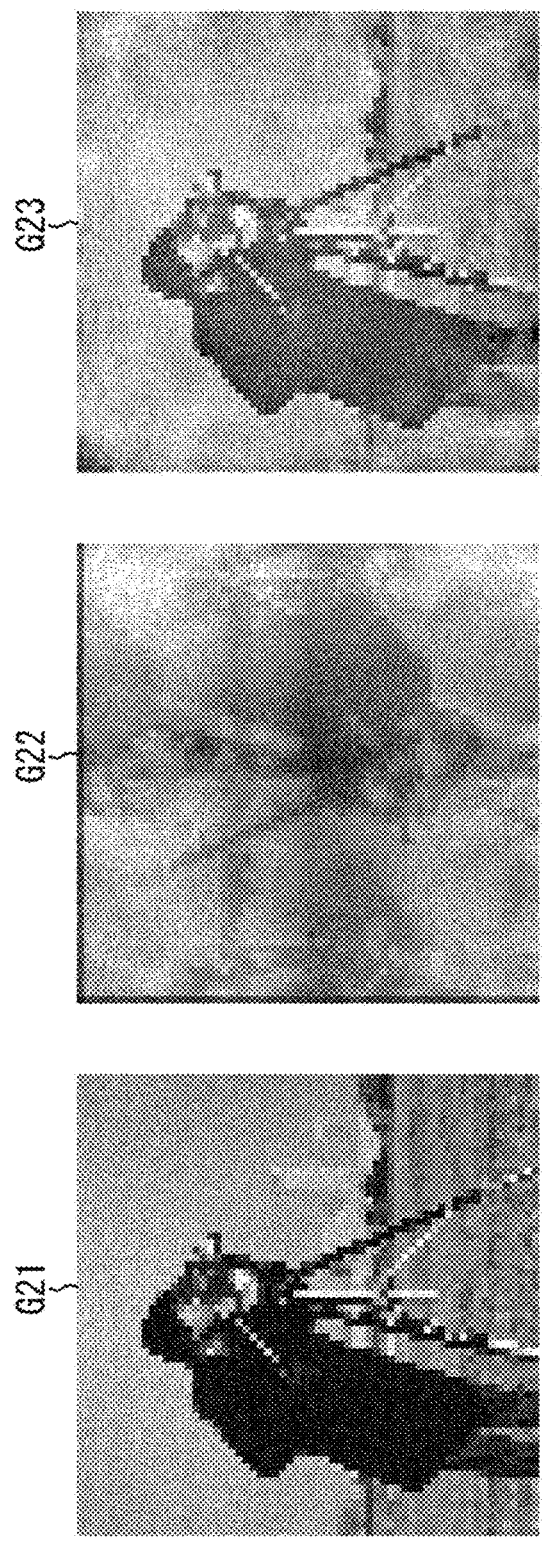
FIG. 11 is a diagram illustrating a subject surface captured in FIGS. 9 and 10, an image captured by an imaging element, and a final reconstructed image.

For this reason, in the case where the image on the subject surface G21 is, for example, the subject surface (image thereof) G21 as illustrated on the left in FIG. 11, the image to be captured (output) by the imaging element 53 is blurred as a whole as illustrated in an image G22 depicted at the center in FIG. 11. This is a condition similar to that described with reference to FIG. 3 in which incident light from the subject surface G1 is modulated by the use of the random mask 52 and captured as an image G2. That is, the condition of the image to be captured by the imaging element 53 becomes similar to that in which incident light from the subject surface G21 which is guided by the lens 101 and the prismatic mirror surface 92 is modulated, and then, the incident light is to be captured as an image G22 by the imaging element 53.

As a result, the reconstruction section 54 reconstructs the image output by the imaging element 53 by using the coefficient sets described above and outputs an image G23 illustrated on the right in FIG. 11 as a final image (restored image).

Further, as described above, the respective points on the subject surface G21 are reflected by the rectangular frustum-shaped mirror surface 71 in a manner distributed over a plurality of points and then concentrated by the lens 101 to be projected onto the respective pixels on the imaging element 53, thus turning into summed pixel signals. As a result, the image of the subject surface G21 is imaged in such a manner that the imaging element 53 is smoothed as a whole, causing the image G22 to appear blurred with a suppressed dynamic range.

For example, in a case where the large opening portion 71a is 2.8 times as large as the small opening portion 71b, that is, in a case where the amount of light received by the imaging element 53 is increased by a factor of 2.8 as a whole, the amount of light on the subject surface (the image thereon) G21 is approximately 2.8 times the amount when the rectangular frustum-shaped mirror surface 71 is not provided. That is, the image to be captured becomes brighter by a factor of 2.8.

However, the dynamic range of the captured image G22 at this time is approximately 1/2.15 times that of the image captured by the imaging element 53 when the rectangular frustum-shaped mirror surface 71 is not provided.

The reason for this is that light from the point light sources on the subject surface G21 is concentrated by the lens 101 after being reflected by the rectangular frustum-shaped mirror surface 71, being distributed to several points on the imaging element 53 and further causing light from a plurality of points to be added together. As a result, all the pixels of the imaging element 53 are subjected to smoothing, so that the detection signal levels are averaged as a whole, thus reducing the dynamic range.

It should be noted that if the image G2 which is a final image is restored by using the image G22 and the coefficient sets described with reference to the formulas (1) to (3), the image G2 is restored to a dynamic range comparable to that of the subject surface G21.

As a result, it is possible to increase the dynamic range of the final image to be reconstructed as compared to the case where the rectangular frustum-shaped mirror surface 71 is not provided by extending exposure time with reduction in the dynamic range of the image captured by the imaging element 53. Also, even if the imaging element 53 has a small dynamic range, it is possible to reconstruct an image having a dynamic range comparable to that of the imaging element 53 with a large dynamic range.

It should be noted that a length of the prismatic light absorption section 91 and the prismatic mirror surface 92 combined (the horizontal length in FIG. 10) is a length corresponding to the focal distance of the lens 101. Accordingly, the reconstruction section 54 reconstructs the image G23 which is a final image (restored image) from the image G22 by using the coefficient sets corresponding to the focal distance of the lens 101 (coefficient sets corresponding to the distance to a subject surface S21 when the lens 101 is used in the imaging apparatus 41).

<Operation of the Prismatic Light Absorption Section>

A description will be given next of the operation of the prismatic light absorption section 91 with reference to FIG. 12.

The imaging apparatus 41 illustrated in FIGS. 9 and 10 captures an image of the subject surface G21 within the field of view FOV. For example, however, in a case where there is a point light source including a point S1 outside the field of view FOV as illustrated in FIG. 12, light from a point S is reflected by the rectangular frustum-shaped mirror surface 71, and the reflected light passes through the lens 101 as diffused light from the virtual point S1 as a point light source.

Here, in a case where the prismatic light absorption section 91 has a mirror surface structure, light that has passed through the lens 101 as diffused light from the virtual point S1 as a light source is repeatedly reflected within the prismatic mirror surface 92 and received by the imaging element 53 as light which should otherwise not be received.

Figure 12:
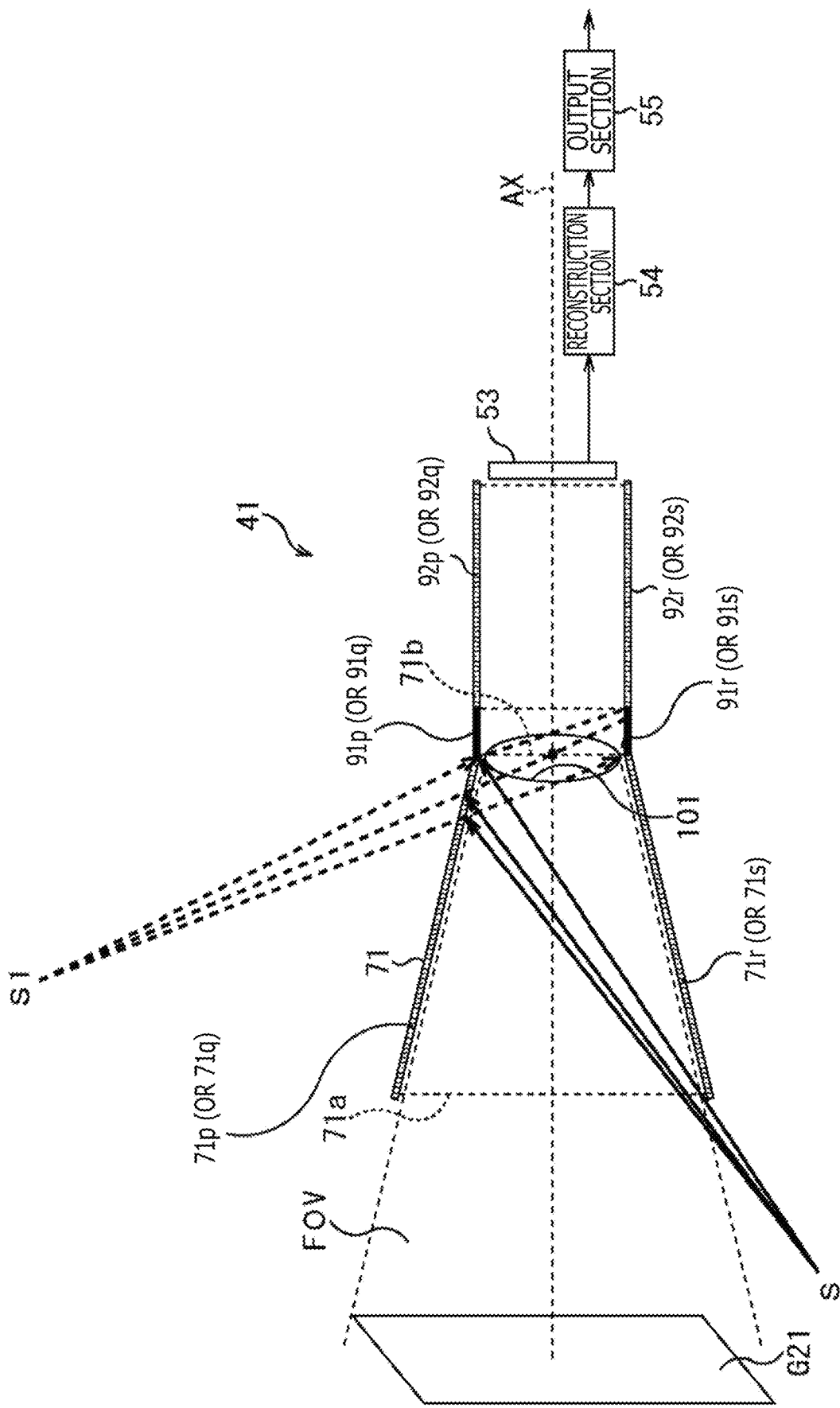
FIG. 12 is a cross-sectional side view illustrating the configuration example of the second embodiment of the imaging apparatus of the present disclosure.

The prismatic light absorption section 91 absorbs light from the virtual point S1 as a light source that has passed through the lens 101 as illustrated in FIG. 12, thus preventing the entry of the light into the prismatic mirror surface 92.

Accordingly, since incident light from the range outside the field of view FOV is absorbed by the prismatic light absorption section 91, the incident light does not enter the prismatic mirror surface 92 and is received by the imaging element 53.

As a result, the prismatic light absorption section 91 ensures that no light from the range outside the field of view FOV is received by the imaging element 53, thus providing improved utilization efficiency of light from the subject surface G21 within the field of view FOV and preventing entry of unnecessary light.

It should be noted that the length of the prismatic light absorption section 91 along the axis AX, as illustrated in FIG. 12, is set such that only incident light from a position outside the field of view FOV is received by the absorption section 91. For example, in FIG. 12, the light from the point S which is outside of the field of view FOV is absorbed by the right side 91r of the light absorption section 91. Also, the prismatic light absorption section 91 need only include a material that prevents the prismatic mirror surface 92 from reflecting light and may include, for example, a light-shielding film or a material that prevents light from entering the prismatic mirror surface 92.

<Opening Angle of the Rectangular Frustum-Shaped Mirror Surface>

A description will be given next of an opening angle of the rectangular frustum-shaped mirror surface 71.

Figure 13:
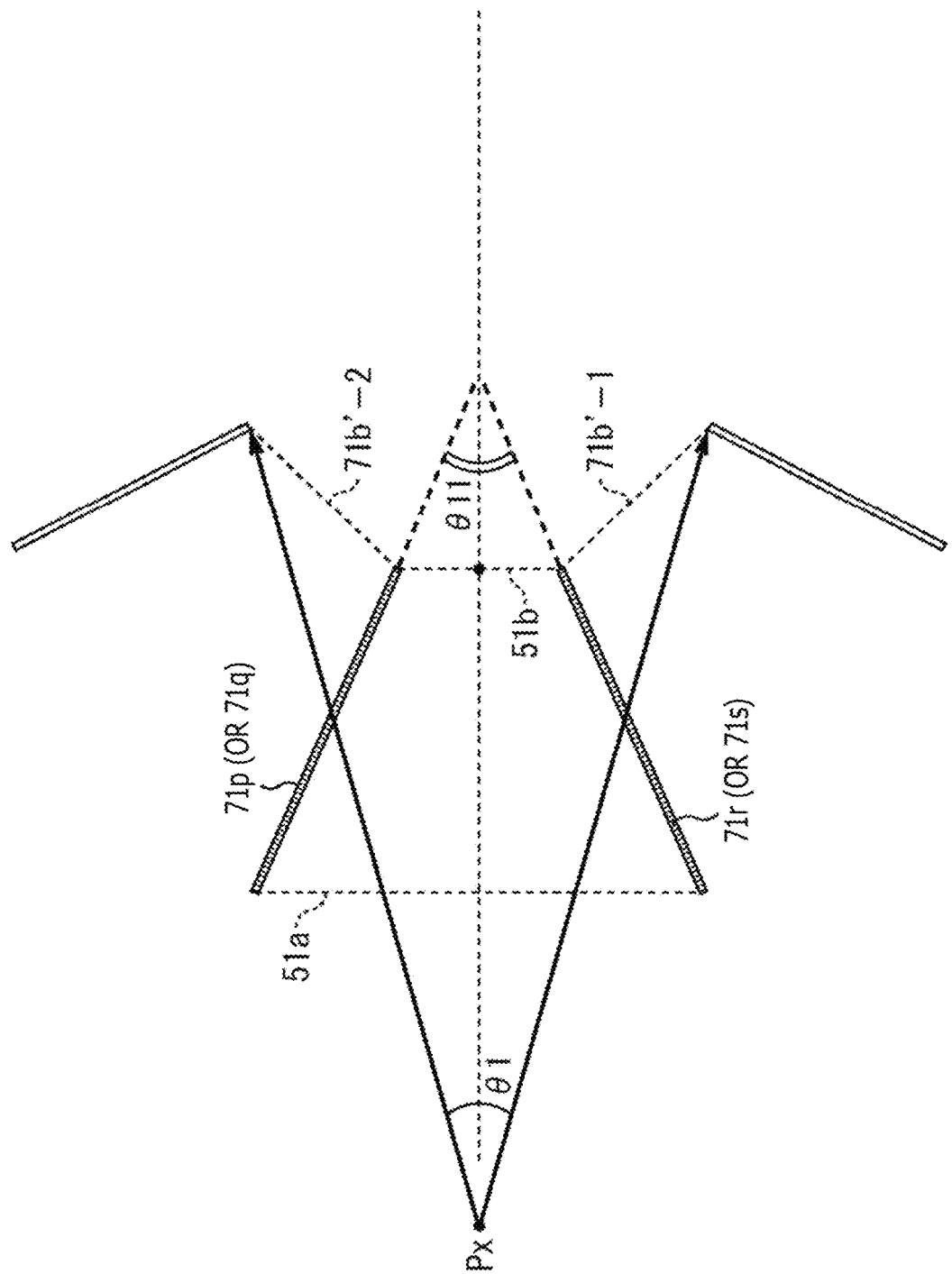
FIG. 13 is a diagram illustrating a relation between an opening angle of a mirror surface and light utilization efficiency.

Here, for example, an angle Θ11 formed between opposed mirror surfaces on the cross section of the rectangular frustum-shaped mirror surface 71 is defined as an opening angle as illustrated in FIG. 13. Also, when diffused light from the virtual point P1 as a point light source passes through the lens 101, is reflected by the prismatic mirror surface 92, and enters the point P1' on the imaging element 53 in FIG. 10, a virtual opening portion corresponding to the small opening portion 71b assuming that diffused light directly enters the point P1' is defined as a virtual opening portion 71b'.

As described above, the amount of light that can be concentrated can be increased by the ratio in area of the large opening portion 71a to the small opening portion 71b.

In other words, as illustrated in FIG. 10, by increasing the area of the virtual opening portion 71b' corresponding to the small opening portion 71b, it can be considered that more diffused light can be concentrated.

For example, as illustrated in FIG. 13, in a case where the opening angle between the planar mirrors 71p and 71r is the opening angle Θ11, the rectangular frustum-shaped mirror surface 71 illustrated in FIG. 12 can concentrate diffused light from a point Px within the range of an angle Θ1 through the real small opening portion 51b and virtual opening portions 71b'-1 and 71b'-2.

Figure 14:
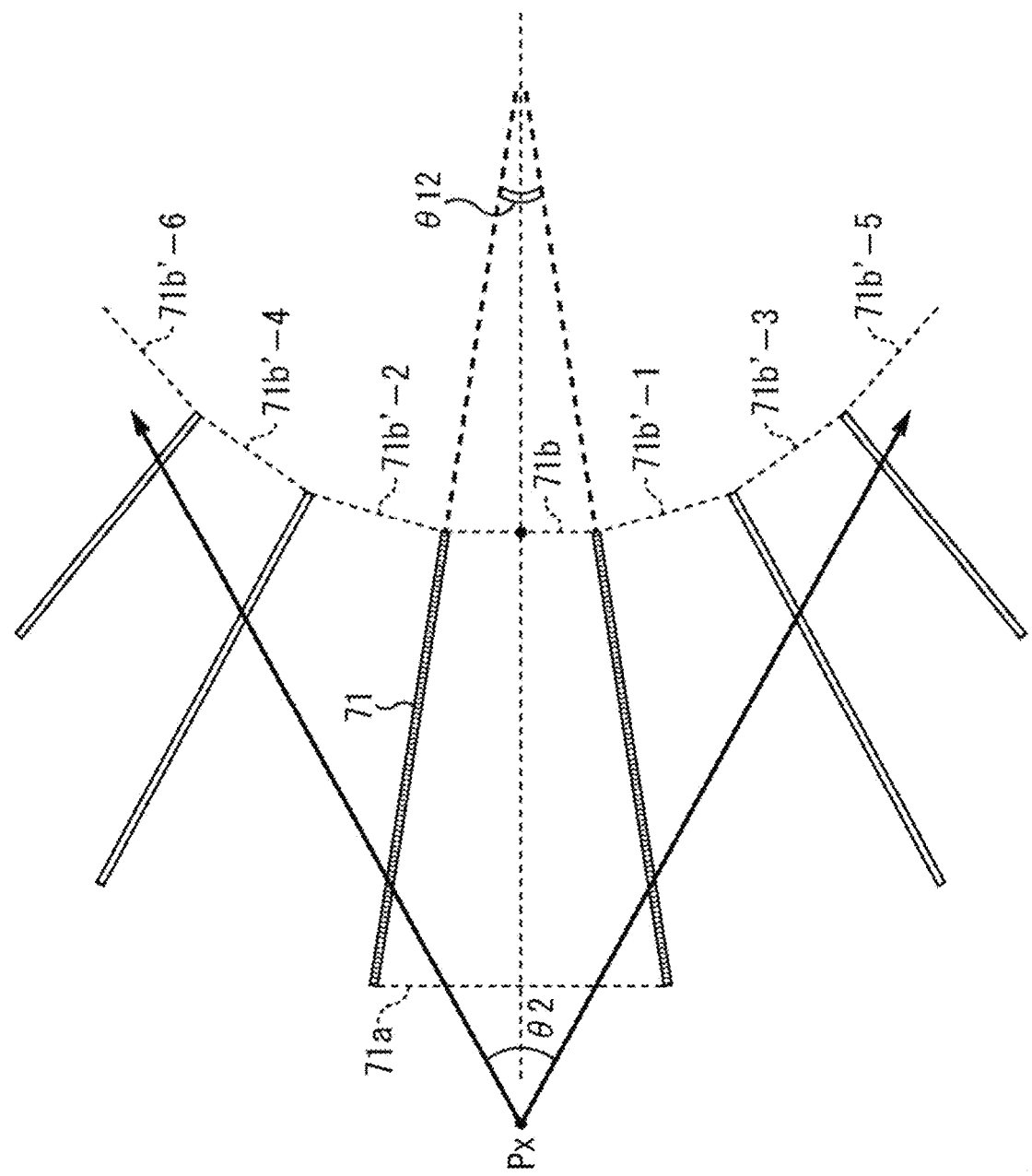
FIG. 14 is a diagram illustrating a relation between an opening angle of a mirror surface and light utilization efficiency.

In contrast, as illustrated in FIG. 14, in a case where the opening angle between the planar mirrors 71p and 71r is set to Θ12 (<Θ11), the planar mirrors 71p and 71r illustrated in FIG. 14 can concentrate diffused light from the point Px within the range of an angle Θ2 (>Θ1) through the real small opening portion 71b and virtual opening portions 71b'-1 to 71b'-6.

That is, it can be considered that, even when the opening angle is small, more light can be concentrated by ensuring that the rectangular frustum-shaped mirror surface 71 is long enough in the direction of incidence of incident light and increasing the number of virtual opening portions. In other words, it can be also considered that, even when the opening angle is small, the ratio of the large opening portion 71a to the small opening portion 71b can be increased by ensuring that the rectangular frustum-shaped mirror surface 71 is long enough in the direction of incidence of incident light.

<Imaging Process by the Imaging Apparatus Illustrated in FIGS. 9 and 10>

Figure 15:
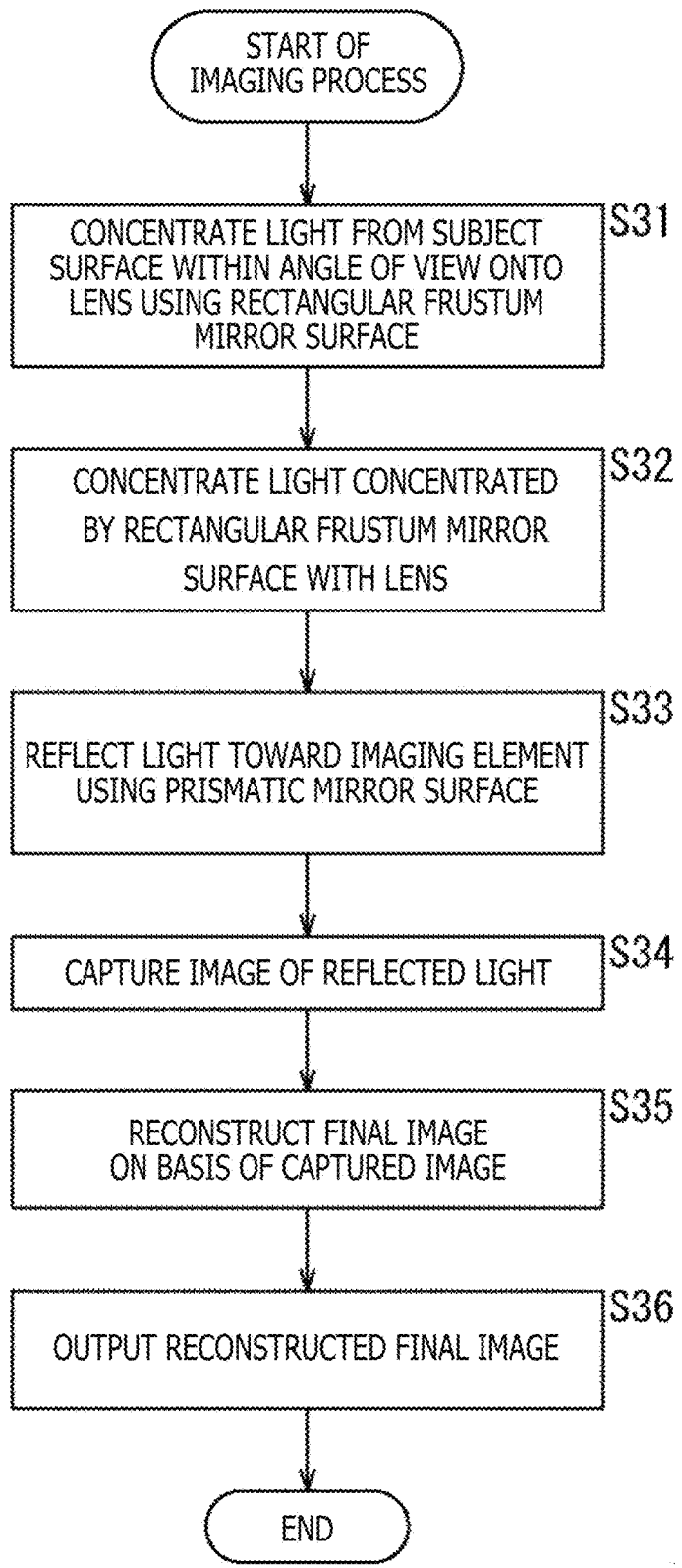
FIG. 15 is a flowchart illustrating an imaging process by the imaging apparatus depicted in FIGS. 9 and 10.

A description will be given next of an imaging process performed by the imaging apparatus 41 illustrated in FIGS. 9 and 10 with reference to the flowchart illustrated in FIG. 15.

In step S31, the rectangular frustum-shaped mirror surface 71 concentrates light from the subject surface G21, causing light to pass through the lens 101.

In step S32, the lens 101 concentrates light from the subject surface G21 concentrated by the rectangular frustum-shaped mirror surface 71, causing light to enter the prismatic mirror surface 92. At this time, incident light from the range outside the field of view FOV is absorbed by the prismatic light absorption section 91.

In step S33, the prismatic mirror surface 92 reflects light from the subject surface G21 concentrated by the lens 101, causing the reflected light to enter the imaging element 53.

In step S34, the imaging element 53 captures an image that includes light from the subject surface G21 and concentrated by the rectangular frustum-shaped mirror surface 71 and the lens 101, outputting the image to the reconstruction section 54. That is, in this case, light of the image of the subject surface G21 is concentrated by the rectangular frustum-shaped mirror surface 71 and the lens 101, thus allowing, for example, the image G22 to be captured by the imaging element 53. As light concentrated by the rectangular frustum-shaped mirror surface 71 and the lens 101 is received by various pixels of the imaging element 53 in a diffused condition and further various beams of light are superimposed on a pixel-by-pixel basis, the pixel value of each pixel is smoothed, causing the image G22 to be captured as a blurred image as a whole (image with a reduced dynamic range).

In step S35, the reconstruction section 54 reconstructs an image by using predetermined coefficient sets on the basis of the pixel signal obtained by capturing an image that includes concentrated light output from the imaging element 53, outputting the reconstructed image to the output section 55 as a final image (restored image). That is, a final image (restored image) as illustrated in the image G23 is obtained, for example, by establishing and solving simultaneous equations for the image G22 using coefficient sets.

In step S36, the output section 55 performs signal processing and outputs a resultant signal as a pixel signal.

That is, the above series of processes allow for capture of a bright image without using an expensive large-diameter lens by using the rectangular frustum-shaped mirror surface 71 and the lens 101. Also, the use of the lens 101 allows for capture of the image G22 captured by the imaging element 53 closer to the final image (restored image) G23 reconstructed by using coefficient sets than in a case where the lens 101 is not used. In other words, it is possible, by using the lens 101, to capture the image G22 as a highly sparse image that can be readily reconstructed into the image G2 which is a final image.

5. Modification Example of the Second Embodiment

Figure 16:
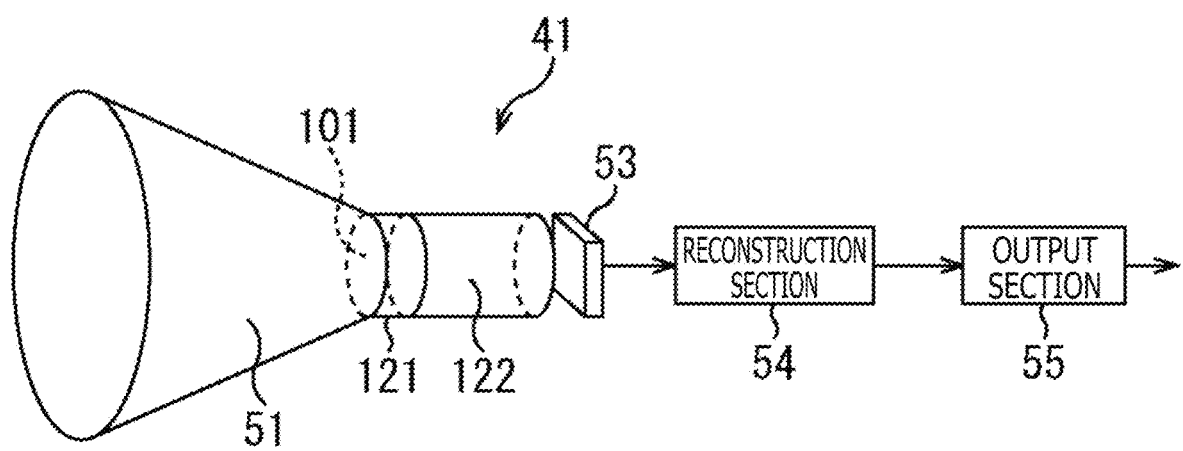
FIG. 16 is a diagram illustrating a modification example of the second embodiment of the present disclosure.

Also, as long as the rectangular frustum-shaped mirror surface has two kinds of opening portions which are a large opening portion and a small opening portion connected to the prismatic mirror surface section and has a mirror surface provided inside the rectangular frustum-shaped mirror surface to guide incident light from the subject surface to the tubular mirror surface, the rectangular frustum-shaped mirror surface may be in other shape and may be the circular frustum-shaped mirror surface 51 as illustrated, for example, in FIG. 16. It should be noted that, however, in the case of the circular frustum-shaped mirror surface 51, a tubular light absorption section 121 and a tubular mirror surface 122 having corresponding shapes (tubular shapes with a circular cross-sectional opening) are required. Also, as long as two kinds of opening portions which are the large opening portion and the small opening portion are provided for guiding incident light, the large and small opening portions may be in asymmetrical shapes, and the two may be dissimilar.

It should be noted that, in the present specification, the term "system" refers to a set of a plurality of constituent elements (e.g., apparatuses, modules (parts)). All the constituent elements may or may not be accommodated in a single housing. Therefore, a plurality of apparatuses accommodated in different housings and connected via a network and a single apparatus accommodating a plurality of modules in a single housing are both systems.

Also, embodiments of the present disclosure are not limited to those described above and can be modified in various ways without departing from the gist of the present disclosure.

Further, each of the steps described in the above flowcharts can be carried out not only by a single apparatus but also by a plurality of apparatuses in a shared manner.

Also, in a case where a single step includes a plurality of processes, the plurality of processes included in that single step can be carried out not only by a single apparatus but also by a plurality of apparatuses in a shared manner.

It should be noted that the present disclosure can also have the following configuration:

<1> An imaging apparatus including:
a guide section configured to guide incident light from a subject to an imaging element;

an imaging section configured to capture an image of the incident light guided by the guide section as a pixel signal; and a signal processing section configured to reconstruct the pixel signal as a final image through signal processing.

<2> The imaging apparatus according to feature <1>, in which the guide section includes a frustum shape having a large opening portion and a small opening portion provided with a mirror surface inside and guides the incident light that enters from the large opening portion through the small opening portion to the imaging element.

<3> The imaging apparatus according to feature <2>, in which the guide section includes a circular frustum shape having the large opening portion and the small opening portion provided with a curved mirror surface inside.

<4> The imaging apparatus according to feature <2>, in which the guide section includes a rectangular frustum shape having the large opening portion and the small opening portion provided with planar mirror surfaces inside.

<5> The imaging apparatus according to feature <2>, in which the imaging element includes a size to be accommodated in the small opening portion, and the guide section increases an amount of incident light entering the imaging section by a scaling factor determined by a ratio in area of the large opening portion to the small opening portion by guiding the incident light from the subject.

<6> The imaging apparatus according to any one of features <1> to <5>, further including:

a modulation section configured to modulate the incident light at a former stage of the imaging element, in which the imaging section captures an image of the incident light guided by the guide section and modulated by the modulation section as the pixel signal.

<7> The imaging apparatus according to feature <6>, in which the modulation section includes a pseudo random mask or a diffractive optical element (DOE).

<8> The imaging apparatus according to feature <6>, in which the modulation section further includes:

a lens configured to concentrate the incident light guided by the guide section.

<9> The imaging apparatus according to feature <8>, in which the modulation section further includes:

a tubular mirror surface that reflects the incident light concentrated by the lens and guides the incident light to the imaging section.

<10> The imaging apparatus according to feature <9>, in which the tubular mirror surface includes a circular cross-sectional opening.

<11> The imaging apparatus according to feature <9>, in which the tubular mirror surface includes a rectangular cross-sectional opening.

<12> The imaging apparatus according to feature <9>, further including:

a tubular light absorption section of the same cross-sectional opening as the tubular mirror surface configured to absorb the incident light at a latter stage of the lens and at a former stage of the tubular mirror surface.

<13> The imaging apparatus according to feature <12>, in which the tubular light absorption section is provided at a position where incident light from a range outside a field of view of the lens enters.

<14> The imaging apparatus according to feature <13>, in which a sum of a tube length of the tubular light absorption section and a tube length of the tubular mirror surface includes a focal distance of the lens.

<15> An imaging method including:

a guiding process of guiding incident light from a subject to an imaging element;

an imaging process of capturing an image of the incident light guided by the guiding process as a pixel signal; and a signal processing process of reconstructing the pixel signal as a final image through signal processing.

REFERENCE SIGNS LIST

11 Imaging apparatus, 31 Lens, 32 Imaging element, 33 Output section, 41 Imaging device, 51 Circular frustum-shaped mirror surface, 51a Large opening portion, 51b Small opening portion, 52 Random mask, 53 Imaging element, 54 Reconstruction section, 55 Output section, 71 Rectangular frustum-shaped mirror surface, 71a Large opening portion, 71b Small opening portion, 71p to 71s Planar mirrors, 71b', 71b'-1, 71b'-2, 71b'-11 to 71b'-16 Virtual opening portions, 91 Prismatic light absorption section, 92 Prismatic mirror surface, 101 Lens, 121 Tubular light absorption section, 122 Tubular mirror surface

The invention claimed is:

1. An imaging apparatus, comprising:
a guide section configured to guide incident light from a subject to an imaging element, wherein
a shape of the guide section is a circular frustum shape,
the circular frustum shape of the guide section includes a large opening portion and a small opening portion, and
each of the large opening portion and the small opening portion includes a curved mirror surface;
an imaging section configured to capture an image of the guided incident light as a pixel signal; and
a signal processing section configured to reconstruct the pixel signal as a final image based on signal processing.

2. The imaging apparatus according to claim 1, wherein the guide section is further configured to guide the incident light that enters from the large opening portion through the small opening portion.

3. The imaging apparatus according to claim 2, wherein a size of the imaging element corresponds to the small opening portion, and
the guide section is further configured to:
determine a scaling factor based on a ratio of an area of the large opening portion to an area of the small opening portion; and
increase an amount of the guided incident light based on the scaling factor.

4. The imaging apparatus according to claim 1, further comprising a modulation section configured to modulate the guided incident light, wherein the imaging section is further configured to capture an image of the modulated incident light as the pixel signal.

5. The imaging apparatus according to claim 4, wherein the modulation section includes at least one of a patterned mask, a diffraction grating, or a diffuser.

6. The imaging apparatus according to claim 4, wherein the modulation section includes a lens, and
the lens is configured to concentrate the guided incident light.

7. The imaging apparatus according to claim 6, wherein the modulation section further includes a tubular mirror surface, and
the tubular mirror surface is configured to reflect the concentrated incident light.

8. The imaging apparatus according to claim 7, wherein the tubular mirror surface includes a circular cross-sectional opening.

9. The imaging apparatus according to claim 7, wherein the tubular mirror surface includes a rectangular cross-sectional opening.

10. The imaging apparatus according to claim 7, further comprising a tubular light absorption section configured to absorb the guided incident light, wherein
the tubular light absorption section is between the lens and the tubular mirror surface, and
a shape of the tubular light absorption section is a tubular shape.

11. The imaging apparatus according to claim 10, wherein the tubular light absorption section is at a specific position, and
the tubular light absorption section is configured to absorb the guided incident light from a range outside a field of view of the lens.

12. The imaging apparatus according to claim 11, wherein a sum of a tube length of the tubular light absorption section and a tube length of the tubular mirror surface includes a focal distance of the lens.

13. An imaging method, comprising:
in an imaging apparatus that includes an imaging element and a guide section:
  guiding, by the guide section, incident light from a subject to the imaging element, wherein
    a shape of the guide section is a circular frustum shape,
    the circular frustum shape of the guide section includes a large opening portion and a small opening portion, and
    each of the large opening portion and the small opening portion includes a curved mirror surface;
  capturing an image of the guided incident light as a pixel signal; and
  reconstructing the pixel signal as a final image based on signal processing.

14. An imaging apparatus, comprising:
a guide section configured to guide incident light from a subject to an imaging element;
a modulation section that includes:
  a lens configured to concentrate the guided incident light; and
  a tubular mirror surface configured to reflect the concentrated incident light;
an imaging section configured to capture an image of the reflected incident light as a pixel signal; and
a signal processing section configured to reconstruct the pixel signal as a final image based on signal processing.

15. The imaging apparatus according to claim 14, wherein a shape of the guide section is a frustum shape,
the frustum shape of the guide section includes a large opening portion and a small opening portion,
each of the large opening portion and the small opening portion includes a mirror surface, and
the guide section is further configured to guide the incident light that enters from the large opening portion through the small opening portion.

16. The imaging apparatus according to claim 15, wherein the shape of the guide section is a circular frustum shape, and
the circular frustum shape of the guide section includes the large opening portion and the small opening portion.

17. The imaging apparatus according to claim 15, wherein the shape of the guide section is a rectangular frustum shape, and
the rectangular frustum shape of the guide section includes the large opening portion and the small opening portion.

18. The imaging apparatus according to claim 15, wherein a size of the imaging element is associated with the small opening portion, and
the guide section is further configured to:
  determine a scaling factor based on a ratio of an area of the large opening portion to an area of the small opening portion; and
  increase an amount of the guided incident light based on the scaling factor.

19. The imaging apparatus according to claim 14, wherein the modulation section further includes at least one of a patterned mask, a diffraction grating, or a diffuser.

20. The imaging apparatus according to claim 14, wherein the tubular mirror surface includes a circular cross-sectional opening.

21. The imaging apparatus according to claim 14, wherein the tubular mirror surface includes a rectangular cross-sectional opening.

22. The imaging apparatus according to claim 14, further comprising a tubular light absorption section configured to absorb the guided incident light different from the concentrated incident light, wherein
the tubular light absorption section is between the lens and tubular mirror surface, and
a shape of the tubular light absorption section is a tubular shape.

23. The imaging apparatus according to claim 22, wherein the tubular light absorption section is at a specific position, and
the tubular light absorption section is configured to absorb the guided incident light from a range outside a field of view of the lens.

24. The imaging apparatus according to claim 23, wherein a sum of a tube length of the tubular light absorption section and a tube length of the tubular mirror surface includes a focal distance of the lens.

* * * * *